Dec. 19, 1967 H. W. PAIGE 3,359,407

SATELLITE ORBIT CHANGING SYSTEM

Filed Oct. 28, 1959 7 Sheets-Sheet 1

INVENTOR:
HILLIARD W. PAIGE,

BY T. E. Kristjenson

HIS ATTORNEY.

ALTITUDE OF DESIRED CIRCULAR ORBIT-NAUTICAL MILES

INVENTOR:
HILLIARD W. PAIGE,
BY T. E. Kristoffersen
HIS ATTORNEY.

SATELLITE ORBIT CHANGING SYSTEM

Filed Oct. 28, 1959 7 Sheets-Sheet 3

INVENTOR:
HILLIARD W. PAIGE,
BY T. E. Kristofferson
HIS ATTORNEY.

INVENTOR:
HILLIARD W. PAIGE,
BY T. S. Kristofferson
HIS ATTORNEY.

INVENTOR:
HILLIARD W. PAIGE,
BY T. E. Kristofferson
HIS ATTORNEY.

INVENTOR.
HILLIARD W. PAIGE
BY
Henry W. Kaufmann
AGENT

INVENTOR.
HILLIARD W. PAIGE
BY
Henry W. Kaufmann
AGENT

United States Patent Office 3,359,407

Patented Dec. 19, 1967

3,359,407

SATELLITE ORBIT CHANGING SYSTEM

Hilliard W. Paige, Berwyn, Pa., assignor to General Electric Company, a corporation of New York Filed Oct. 28, 1959, Ser. No. 849,239
7 Claims. (Cl. 235—150.2)

This invention relates to a computer and associated equipment for modifying the orbit of a satellite body and more particularly to such an equipment for circularizing an elliptical orbit or for making an elliptical orbit, or transfer orbit, from a circular orbit so that a transfer may be completed between one circular orbit and another of greater or lesser radius.

Prior art methods suggested for achieving a desired orbit have involved the use of an exceedingly accurate guidance system in connection with the missile used to place the satellite in orbit. This is a highly involved technique if it is desired to use guidance accurate enough to arrive at a predetermined orbit which is circular and not elliptical. Such a result has not been capable of performance with present booster guidance systems. Accordingly it is an object of this invention to provide a satellite orbit control system capable of compensating for inaccuracies arising from error tolerances on the main missile control and guidance system of a vehicle whose purpose it is to place a satellite in a particular orbit.

Another object of the invention is to provide a control system capable of circularizing an elliptical orbit.

Still another object of the invention is to provide a control system capable of creating an elliptical transfer orbit used to transfer a satellite from one circular orbit to another.

A further object of the invention is to provide a computer which will compute the proper amount of thrust and the proper time for applying the thrust to perform an orbital transfer.

A still further object of the invention is to provide such a control system which will compute the point of apogee or the point of perigee and the amount of thrust required at each of these points to circularize an orbit at that radius.

A more particular object of the invention is to provide a computer which will compute the amount of thrust required at apogee and the point in time at which apogee has been reached and which is capable of triggering a thrust producing mechanism for circularizing the orbit at a radius equal to the radius at apogee.

In carrying out the invention in one particular embodiment thereof, a horizon signal is provided in the form of pulse width information from a reference sensor and an error signal voltage representing the tilt around the pitch axis of the satellite. These two signals are inputs to the computer, which is designed to be used when the scan axis of the reference sensor is oriented along the horizontal axis corresponding to the roll axis of the vehicle. The first of these signals, which is the uncorrected reading in degrees of a half portion of scan representing the earth, is fed into an adding amplifier along with the second signal which has been modified by dividing by the sine of the corrected reading in degrees of the half portion of scan representing the earth. A second amplifier may then be used to reverse the sine of the output of the first amplifier and to drive a servo with an incremental function stepper having an output which is related to the corrected reading in degrees of the half portion of scan representing the earth. The incremental function stepper is used to position three non-linear potentiometers. The first of these non-linear potentiometers has an output proportional to the cosecant of the corrected reading and an input across it which is the error or tilt signal. Thus its output can be used to feed back to the input of the first amplifier and provide the amplifier input with the error signal divided by the sine of the corrected reading in degrees of the half portion of scan representing the earth.

If attempting the orbit change from a ballistic trajectory where no perigee will ever actually be achieved, the perigee information may be pre-set in the computer. The velocity impulse required to circularize the orbit at apogee can be related to the corrected reading in degrees of the half portion of scan representing the earth at apogee and at perigee. The relationship is the sum of a non-linear function of the corrected angle at perigee and a constant times a second non-linear function of the corrected angle at perigee times a non-linear function of the corrected angle at apogee. These functions may be calculated and mechanized for the computer through the use of non-linear servo-driven potentiometers. Since we are assuming that the perigee information is pre-set, the function of the corrected angle at perigee in both instances may be fixed through the use of trim pots. The function of the corrected angle at apogee is a non-linear function which is simulated by the second non-linear potentiometer connected to the shaft driven by the servo with the incremental function stepper. Thus, two inputs are applied to another adding amplifier. One of them, the non-linear function of the corrected angle at apogee times the trim pot representing the second function of the corrected angle at perigee, and the other the trim pot representing the first function of the corrected angle at perigee. The output of this adding amplifier is proportional to the orbit changing pulse required at apogee to circularize the orbit. Altitude may be computed on a separate channel since it is a non-linear function of the corrected angle. Another non-linear potentiometer, the third one connected to the incremental function stepper servo which is positioned by the corrected angle, provides an output directly proportional to altitude derived from a D.C. reference input. If this computer is to apply a pulse for circularizing the orbit at apogee, the point at which the incremental function stepper, representing the corrected angle, reverses is taken as the point of apogee. This reversal would be used to trigger a thrust mechanism such as a jet valve to apply an amount of thrust at that time as indicated by the output of the third computer amplifier.

The embodiment described above is only exemplary and the invention is not considered to be limited thereto. For example, although analogue techniques are described herein, it is obvious that digital techniques would apply as well. Accordingly, the novel features which are believed to be characteristic of the invention are set forth with particularity in the appended claims. The invention itself, however, together with further embodiments, objects and advantages thereof, can best be understood by reference to the following description taken in connection with the accompanying drawings in which:

The invention will now be described in connection with the above-mentioned drawings. The purpose of the invention is to provide automatic means of adjusting the energy level of a particular vehicular orbit in a proper amount and direction and at the proper time to achieve a desired pre-selected orbit different from the original orbit. The invention reduces the cost and complexity of the guidance equipment required to achieve a given level of orbital accuracy, by applying an adjustment while the satellite is in orbit to control the orbit more accurately than possible by the present system of guidance in the missile booster only. The computer employed may be utilized to perform several types of orbital adjustment as well as combinations thereof. It may change an intial elliptical orbit to a circular orbit with a constant radius from earth's gravitational center smaller than perigee, or equal to perigee, of the initial orbit. It may change an initial elliptical orbit to a circular orbit with a constant radius from the earth's gravitational center larger than the initial perigee radius but either smaller than the initial apogee radius, equal to the inital apogee radus or larger than the initial apogee radius. It may change an initial circular orbit or arrive at a circular orbit and then change it to an elliptical orbit with the perigee-gravitational center-apogee line in a controlled position in space.

The invention consists of a system comprising an adjustment information sensing sub-system, an orbit adjustment computer and a number of propulsion sources controlled by the output of the computer. These sub-systems and components are mounted upon the orbiting vehicle, which is required to be stabilized in pitch and roll with respect to the local horizontal and in yaw with respect to the orbital plane in inertial space. Orbital adjustment can be based on two types of information: altitude information or pitch rate information. Altitude information may be obtained as an output of the stabilization system or sensed separately, for example, by a radar altimeter. Pitch rate may be sensed by a rate gyro.

A horizon stabilization system which determines the total angle subtended by the earth from the satellite with the aid of the computer develops altitude information which may be used for orbital adjustment. One posisible system utilizes two or more infra-red horizon sensors such as described in a co-pending application entitled "Attitude Stabilizer for Space Vehicles" of Emanuel Fthenakis, Ser. No. 849,327, filed Oct. 28, 1959 and assigned to the same assignee as the present invention.

Figure 14:
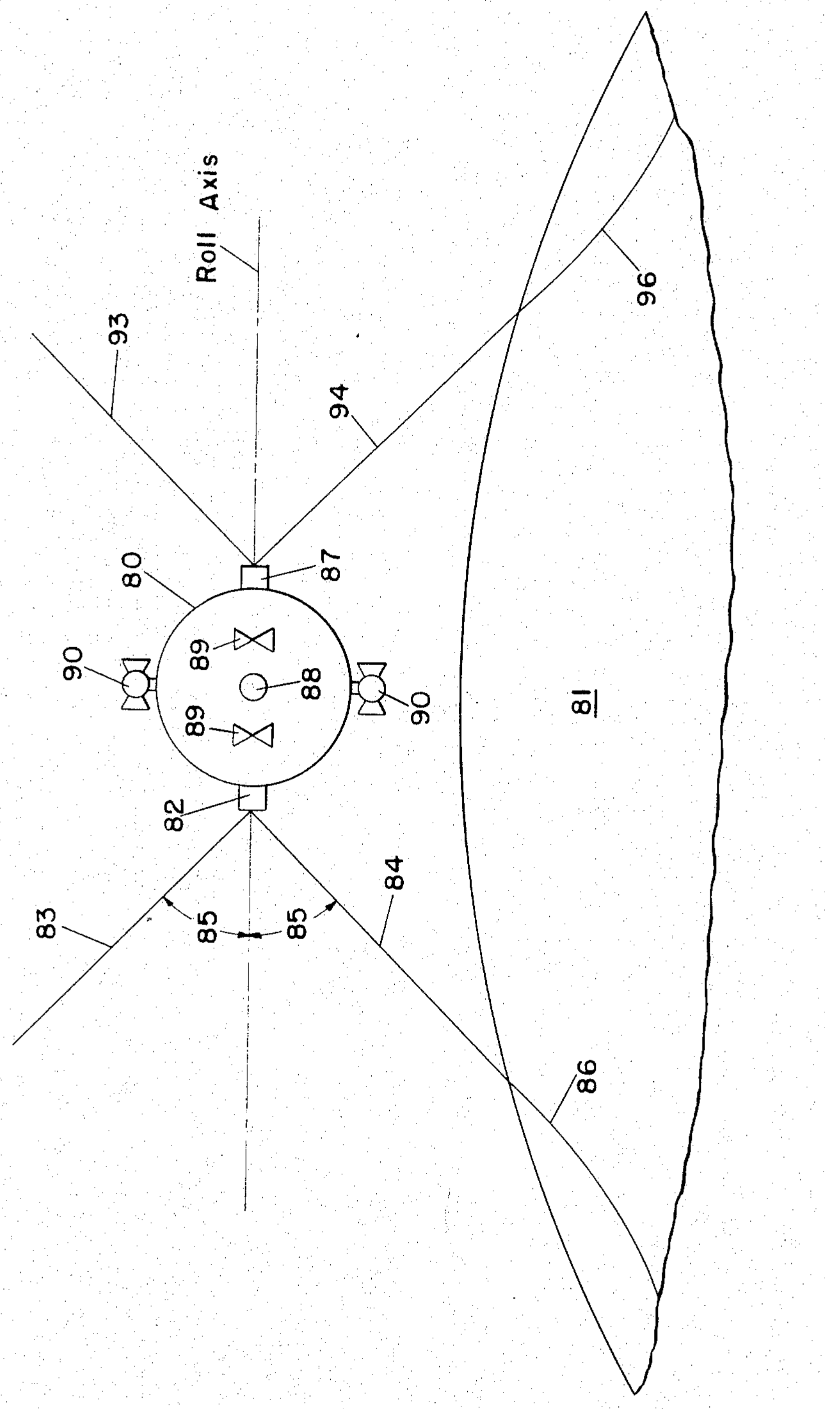
FIGURE 14 represents in general relationship a satellite provided with sensing scanners and nozzles for emission of propulsive jets, in transit above a portion of the earth.

FIGURE 14 is provided for clearer indication of the geometrical relations involved. A satellite vehicle 80 (represented arbitrarily as a sphere) is represented in a stable attitude above a portion 81 of the earth's surface. Two scanning sensors 82 and 87 are represented mounted symmetrically on the vehicle 80, at opposite ends of the roll axis. The scan of sensor 82 is in a cone whose extremes in a vertical plane are represented by lines 83 and 84, the half-angle of the vertex of the cone being either of the angles designated as 85. Line 86 represents the trace, or intersection, of the scan of sensor 82 with the surface of the earth 81. Similarly, sensor 87 executes a conical scan whose vertical extremes are represented by lines 93 and 94, and which has a trace 96 with the surface of the earth 81. Sensor 88 is represented mounted at one end of the pitch axis of the vehicle, and has a complementary sensor at the other end of the pitch axis, which is concealed by the vehicle 80 as represented, so that the complementary sensor does not appear in the representation of FIGURE 14. The pitch axis is a line orthogonal to the plane of the paper in the representation and thus does not appear, since it would form merely a dot in the center of sensor 88. The boundaries of the scan of sensor 88 cannot be represented in the projection employed for FIGURE 14, and its intersection or trace on the surface of the earth 81 is assumed to lie beyond the portion of 81 represented. For completeness there are represented nozzle units 89 and 90 adapted to the emission of reaction jets. Two nozzle units 89 are represented, each unit 89 being dual in that it is provided with means for discharging a jet either upward or downward. For application of pure thrust rather than an off-center thrust which would also produce a moment, the represented nozzle units 89 are complemented by another pair of nozzles symmetrically located with respect to the first pair and thus located on the back portion of vehicle 80, which is invisible in the present representation. Nozzle units 90 are located symmetrically at opposite ends of the yaw axis (which is not otherwise represented) and are representd as quadruple, each unit being adapted to discharge a reaction jet in any of four mutually orthogonal directions, all horizontal in the representation of FIGURE 14. The nozzle units represented or implied are thus capable of providing upward or downward thrust or thrust in any horizontal direction.

Figure 15:
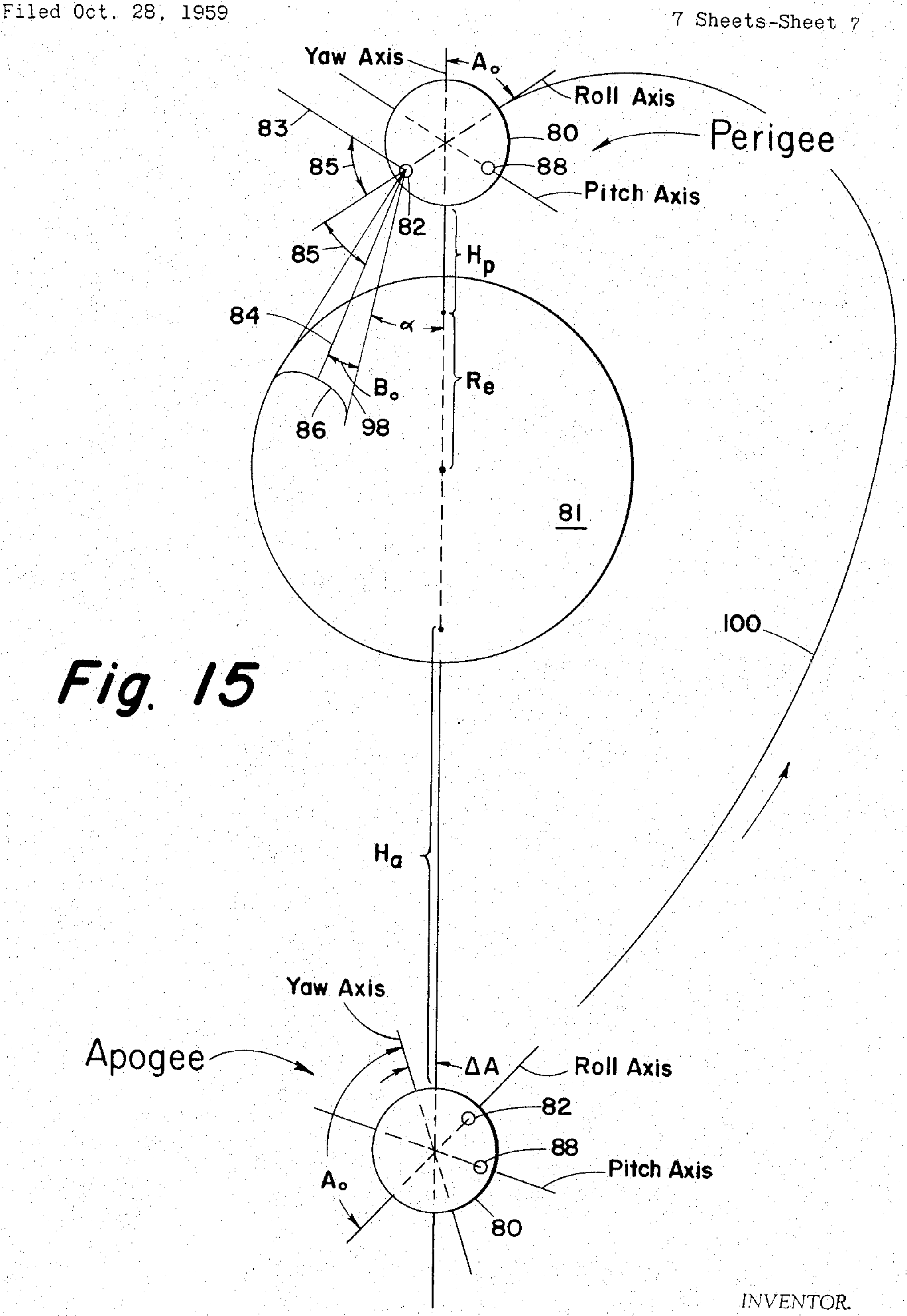
FIGURE 15 represents generally the apogee and perigee positions of a satellite equipped with an embodiment of the present invention, showing the various axes of reference and representing certain parameters characteristic of the satellite's attitude and position with respect to the earth.

FIG. 15 is an isometric representation of some of the subject of FIG. 14, but with some omissions for clarity and some further details. The satellite 80 is shown in two different positions corresponding to perigee and apogee of an elliptical orbit. At perigee, the satellite 80 is represented as perfectly oriented with its yaw axis in line with the local vertical which is in line wth the height at perigee, designated $H_p$. The roll axis and the pitch axis are also represented as horizontal. The angle between the yaw axis and the roll axis is designated as $A_0$. The boundaries 83 and 84 of the scan from scanner 82 are represented; and the trace of intersection of the scan cone with the earth 81, which is designated as 86 in FIG. 14, is here represented. The line extending from the end of 86 back to scanner 82 is designated 98. The angle between lines 84 and 98 subtends one-half of the trace 86 and is designated $B_0$. The angle between line 98 and the local vertical is designated $\alpha$. It is apparent that the closer satellite 80 approaches to the earth 81 (that is, the smaller its altitude $H_p$), the greater will be the arc $B_0$. Equations relating the magnitude of $B_0$ with altitude appear infra. The satellite 80 is also represented at apogee, and is here shown in a position of tilt, the yaw axis not coinciding with the local vertical (which coincides with the height at apogee, designated $H_a$); the angle between the local vertical and the yaw axis is designated as $\Delta A$. Since the angle between the roll axis and the yaw axis is $A_0$, adding $A_0$ to $\Delta A$ gives the angle between the roll axis and the local vertical. It is evident, considering the arc $B_0$ once more, that if the satellite yaw axis is at an angle with the local vertical, as represented at apogee, the magnitude of $B_0$ will be altered. For this reason, scanner 88 is used to determine the value of angle $\Delta A$, as described in the referenced application of Fthenakis, to permit correction of the magnitude of $B_0$ under these circumstances. The distance from the satellite at perigee to the center of the earth will, of course, be equal to the radius of the earth, $R_e$, plus the height at perigee $H_p$; this will in certain places, infra, be identified as $R_p$. Similarly, the height at apogee, $H_a$, plus the radius of the earth, $R_e$, will be designated as $R_a$. One-half of the elliptical orbit is represented, numbered with reference number 100. The direction of motion of satellite 80 will, of course, always be approximately in the direction of the roll axis. Symbols similar to the preceding will appear but cannot be represented here. For example, the term, $B_c$, will be used to refer to a corrected value of $B_0$, obtained by mathematical operations and not capable, therefore, of being represented by a drawing. For convenience also, in order to leave room for clear identification of the various axes and other lines, some of the details of FIG. 14, such as the jets 90 and 89, have been omitted. The scanner 87 is invisible in FIG. 15 and, therefore, the boundaries 93 and 94 of its scan and the earth trace 96 of its scan, have been omitted. FIGS. 14 and 15 are intended to supplement each other and not to duplicate each other.

The angular orientation of the sensors with respect to the controlled vertical line of the vehicle and the total field of view of each sensor are chosen to encompass the predicted altitude tolerance of the booster guidance system. Each sensor field of view is scanned to determine the position of the horizon line which is the dividing line between the presence and absence of infra-red radiation. Should the horizon position registered by one infra-red sensor be different from that of another, an error signal is developed and amplified through the electronics to actuate the stabilization system which provides an adjusting torque to the satellite in a direction to reduce the error signal. Determination of the angle between the horizon position and the local vertical inherent in the stabilization method determines altitude in accordance with the relation $$H=R_e\frac{1-\sin\alpha}{\sin\alpha} \qquad (1)$$

where $H$=altitude above ground
$R_e$=earth's radius
$\alpha$=angle between horizon and local vertical This measure of vehicle altitude may be used as an input to the adjustment computer. As previously mentioned, altitude determined separately, as for instance by a radar altimeter, may also be used as an alternative computer input or, since there is a unique and constant pitch rate associated with the horizon stabilized vehicle in a constant altitude orbit, this variable may also be used as a basis for design of an orbit adjustment computer. The manner in which an orbit adjustment computer operates is as follows in the mode where circularization of an elliptical orbit is required: The orbit adjustment computer accepts altitude information measured by sensing devices on the satellite, compares them with the stored pre-set value corresponding to the desired circular orbit and computes the amount and timing of additional impulses required to achieve the desired orbit. Control signals to the propulsion sources are the output of the orbit adjustment computer. The design of such a control system can be accomplished using several different approaches. One such approach is illustrated by applying impulses to the satellite in the direction of, or opposed to, the velocity vector when the satellite is at perigee or apogee to achieve the desired adjustment. Another such system applies the adjusting impulses to the satellite when it is at desired altitude, $H_0$.

With the first type of system, the orbit change may be made in two steps. Sufficient impulse may be given to a satellite at apogee to cause the perigee to move out and create a transfer ellipse. At a subsequent time, orbital energy may be subtracted at the perigee of the transfer ellipse to cause the apogee to move in and circularize an orbit around the perigee of the transfer ellipse. To mechanize such as system, a provision must be made for the solution of two basic problems; the amount of impulse to be added at the two points must be calculated and a means provided for determining the proper time for applying the impulses. The solution of either of these problems requires a measurement of the altitude of the satellite above the earth. This may be done by means of the infra-red techniques disclosed in the above-referenced co-pending application. With the altitude known, the amount of impulse to be added at apogee and perigee can be calculated as follows: The initial orbital energy is $$\frac{E_1}{m}=K\left(\frac{1}{R_e}-\frac{1}{2R_e+H_{a1}+H_{p1}}\right) \qquad (2)$$

Where $K=GM$, the gravitational constant times the mass of the earth, $m$ is the satellite mass, the subscripts $a$ and $p$ denote apogee and perigee and the numeral subscripts different times. After the first change, the desired orbital energy is $$\frac{E_2}{m}=K\left(\frac{1}{R_e}-\frac{1}{2R_e+H_{a1}+H_0}\right) \qquad (3)$$

Taking the difference of Equations 2 and 3, we have $$\frac{\Delta E_1}{m}=\frac{E_2-E_1}{m}=\frac{K(H_0-H_{p1})}{(2R_e+H_{a1}+H_0)(2R_e+H_{a1}+H_{p1})} \qquad (4)$$

If the initial orbit is such that $H_{a1}$ and $H_{p1}$ are not greatly different from $H_0$, then $$\frac{\Delta E_1}{m}=\frac{K(H_0-H_{p1})}{(2a_n)^2} \qquad (5)$$

Where $a_n$ is equal to the nominal major semi-axis $(R_e+H_0)$. Similarly, the energy to be supplied at the second point is $$\frac{\Delta E_2}{m}=\frac{K(H_0-H_{a1})}{(2a_n)^2} \qquad (6)$$

To relate the energy change to required impulse $$\frac{\Delta E}{m}=V\Delta V=V\frac{(F\Delta t)}{(m)} \qquad (7)$$

where V is velocity, $t$ is time and F is force. If the eccentricity of the ellipse is such that V does not vary greatly from the velocity of a circular orbit at $H_0$, then $$\left(\frac{F\Delta t}{m}\right)_1\approx\frac{K(H_0-H_{p1})}{(2a_n)^2V_n}=\frac{(Ka_n)^{1/2}(H_0-H_{p1})}{(2a_n)^2} \qquad (8)$$

and $$\left(\frac{F\Delta t}{m}\right)_2\approx\frac{(Ka_n)^{1/2}(H_0-H_{a1})}{(2a_n)^2} \qquad (9)$$

Thus, the two desired impulses can be scheduled by measuring $(H_0-H_{p1})$ and $(H_0-H_{a1})$ and multiplying by a constant. The magnitude of the impulse required for a given altitude change is roughly 1.8 lb. sec./slug/nautical mi. if the desired $H_0$ is 150 nautical miles. Thus to convert an ellipse with $H_a$ equal to 200 nautical miles and $H_p$ equal to 100 nautical miles, two impulses of 90 lb. sec./slug each are required. For a 10 slug satellite and a propellant with specific impulse of 300 seconds, this amounts to 6 pounds of propellant. The error incurred due to the approximations in the preceding calculations can be evaluated from $$\frac{\Delta(2a)\text{ obtained}}{\Delta(2a)\text{ desired}}=\left(\frac{2a}{a_n}\right)^2\left(\frac{V}{V_n}\right) \qquad (10)$$

Equation 10 gives the change in the major axis obtained over the change desired where $$\frac{2a}{a_n}=\frac{\text{actual value of major axis}}{\text{nominal value of major axis}}$$

$$\frac{V}{V_n}=\frac{\text{actual velocity at point impulse is applied}}{\text{nominal circular velocity}}$$

Evaluation of Equation 10 shows that for an initial ellipse with perigee between 100 and 150 nautical miles, and apogee between 150 and 350 nautical miles, the desired change in perigee is achieved within about 2%. The desired change in apogee is achieved within about 6%.

Figure 1:
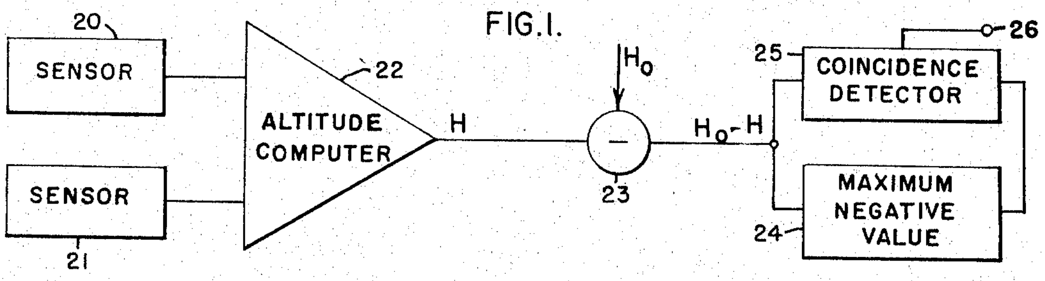
FIGURE 1 illustrates a broad block diagram of one embodiment of a computer for modifying an orbit.

One problem associated with this system lies in determining the points at which to apply the necessary impulses. Two possibilities exist here. The altitude may be measured alone, or a measurement may be made of the rate of change of altitude. In utilizing altitude measurements only, the system mechanization might appear as shown in FIGURE 1. The outputs of two infra-red sensors, 20 and 21, are fed to an altitude computer 22 which operates to determine altitude using the techniques described in the above referenced co-pending application. The output of altitude computer 22 is altitude, H, which is subtracted in subtraction network 23 from the desired altitude, $H_0$. The maximum negative value of the output of subtraction network 23 is stored in storage device 24 and compared on a subsequent orbit in coincidence detector 25 to the current value of $(H_0-H)$. When these two coincide, apogee has been reached and a firing signal is applied to output terminal 26. However, due to detector errors and possible orbital decay, the number stored may be larger than any number that will be subsequently reached. For this reason, the system must be designed such that the firing signal is given when the magnitude of the measured $(H_0-H)$ is a maximum. Similar considerations apply to the firing of the second rocket.

Figure 2:
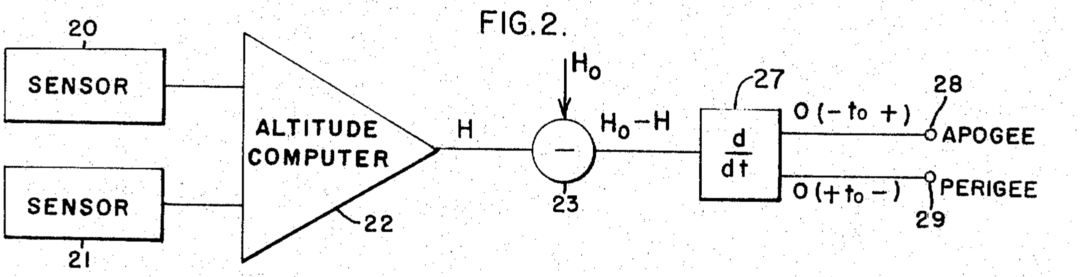
FIGURE 2 represents a block diagram of another embodiment of such a computer.

A second approach for determining when the satellite is at apogee or perigee would utilize the rate of change of altitude. A mechanization of such an approach is indicated by the block diagram of FIGURE 2 wherein similar numbers are used to designate similar components of the system that are the equivalent of those illustrated in FIGURE 1. This is done throughout the specification. In FIGURE 2 again sensors 20 and 21 feed information to altitude computer 22 which computes the altitude, H, which is subtracted in subtraction network 23 from the desired altitude, $H_0$. The output of subtraction network 23 is differentiated in differentiator 27. When the differential goes through 0 changing from negative to positive, the satellite is at apogee, as is indicated as an output on terminal 28. When the signal goes through 0 changing from positive to negative, the satellite is at perigee which is indicated as an output on output terminal 29. The accuracy of this approach is limited by the extremely low rates of change of altitude near apogee and perigee.

In the second means of circularizing the orbit mentioned above, adjustment is made in one step. At a point in the elliptical orbit when the desired altitude is reached, the satellite has a velocity component parallel to the local vertical of $V_0$ ($\sin\theta_0$) and a component perpendicular to the local vertical of $V_0\cos\theta_0$ where $\theta_0$ is the angle between the velocity vector and the tangent to a circular orbit at the point. If at this point two impulses are applied, one along the yaw axis of $mV_0\sin\theta_0$ and one along the roll axis of $m(V_c-V_0\cos\theta_0)$, a circular orbit at the altitude will be achieved. (Where $V_c$ is the velocity of the satellite in the desired circular orbit.)

Three rocket motors would be required to allow for the possible variations; one to fire along the yaw axis and one along the roll axis and one to fire rearward along the roll axis. Whether the rocket mounted on the yaw axis fires away from or toward the earth depends upon whether the adjustment is made as the altitude decreases through $H_0$ or increases through $H_0$.

More impulse is required to achieve a circular orbit by means of this method as compared to that described previously. For this system to change an elliptical orbit with $H_a$ equal to 200 nautical miles and $H_p$ equal to 100 nautical miles, to a circle with $H_0$ equal 150 nautical miles, an impulse of 350 pounds sec. per slug is required. For system 1, the requirement was roughly 180 pounds sec. per slug or about one half as much. Second, computation of the impulse required along the yaw axis is a strong function of both $H_a$ and $H_p$ and does not vary linearly with either of them, requiring the use of a variable non-linear function generator for impulse computations. However, the determination of the point at which the impulse is to be applied is simpler in this system as it requires only that $H_0$ be stored prior to launch and compared to the measured altitude. Means must be provided for insuring that the rocket is fired either as H is increasing or decreasing depending upon whether the yaw axis rocket fires toward the earth or away from it.

The implementation of a system of the type described above for circularizing an orbit at apogee or at perigee will now be considered. Circularization is desirable for many of the applications of satellites, for example, such as mapping, photography and fixed range communication vehicles. These orbits may also be practical for space stations since rendezvous and orbit ejections are less complex. The orbit transfer technique of a computer is capable of altering the eccentricity of an elliptical orbit at any point along its path. However, considerations such as simplicity and accuracy and minimum amount of impulse to be applied suggest the design of a specific adjustment computer for adjustment at apogee or perigee.

In order that a vehicle be travelling in a circular orbit, the magnitude and angle of its velocity vector must satisfy the definition of such an orbit at the given altitude. The vehicle is attitude controlled around its pitch and roll axes such that the horizontal and vertical axes of the vehicle are defined by an earth fixed coordinate system. This is done in the manner described in the above copending referenced application by use of the infra-red sensors and their associated system. For a circular orbit, the velocity of the vehicle varies inversely with the square root of the distance from the earth's center. If the earth is assumed spherical, the angle which the velocity vector makes with the horizontal axis of the attitude stabilized satellite is always zero. An elliptical orbit is specified by a velocity vector which has horizontal and vertical components along the axes of the vehicle. The magnitude of the vector is a function of the altitude at apogee, perigee and the given point on the orbit.

To circularize an elliptical orbit, the vertical component of the velocity vector must be removed and the horizontal component altered in such a way that it is equivalent to the magnitude of the velocity vector of a circular orbit at the given altitude. The magnitude and angle of the adjustment impulse are specified by the above conditions. At apogee and perigee of an elliptical orbit, the angle which the velocity vector makes with the orbit path is zero. Therefore, only the horizontal component of the adjustment impulse is necessary to circularize the orbit. Because of this, and other considerations, the adjustment computer is greatly simplified if it is designed to adjust orbits only at apogee. This makes the choice of an initial orbit important since the only possible circular orbit resulting from an adjustment of this type is at the altitude of apogee. However, this is no limitation because any desired orbit can be obtained if the proper transfer orbit is utilized. This would, of course, involve two changes.

The adjustment impulse required involves only altitude measurements as the necessary inputs to the adjustment computer. For the sake of simplicity, an adjustment computer will be described which is limited to adjustment of an orbit at apogee. In this case, only two altitude readings are necessary—those at apogee and perigee—to calculate the velocity impulse needed to circularize the orbit. The infra-red horizon sensors described in the above referenced co-pending application had been utilized to provide altitude information for the computer. The primary use of this sensor system, however, is attitude stabilization, but it has been adapted by means of this invention to yield altitude information. The horizon sensors are designed to attitude stabilize the vehicle around the pitch and roll axes. The third axis can be stabilized by a number of different sensing systems such as a magnetic aspect sensor, which makes use of the earth's magnetic field to sense yaw motion. These stabilizations keep the vehicle oriented in such a way that its axes are fixed relative to the earth. The yaw axis is coincident with the local vertical direction of the earth. Therefore, the roll and pitch axes of the vehicle are in a plane perpendicular to the vertical axis passing through the center of the earth. The assumption will be made here that the earth is a perfect sphere.

The sensors described in the above referenced co-pending application make use of the fact that the earth is relatively hot, while the sky is cold. The voltage output is inversely proportional to the amount of infra-red radiation falling on the detectors and thus to the relative amounts of sky and earth seen by the sensors. This system contains two infra-red horizon sensors mounted on the vehicle perpendicular to each other. The cone angle of the scan is 90 degrees and is referenced at 180 degree intervals at the point where the scan circles intersect the pitch-yaw plane and the roll-yaw plane. If one sensor is taken as the reference sensor, its output, the uncorrected reading in degrees of the portion of scan representing the earth or $2B_0$, is a voltage pulse proportional to the amount of scan that intersects the earth. For the computer described the reference scan axis of the infra-red-horizon sensor system coincides with the horizontal axis corresponding to the roll axis of the vehicle. The second, or other, infra-red sensor measures the attitude error, $\Delta A$, or tilt. This is the angle between the local horizontal and the reference sensor scan axis. This information is provided by phase shift detection in the second infra-red sensor. $\Delta A$ is reflected physically as increasing or decreasing $2B_0$ in the reference scan circle. This information is measured as pulse width data from the first infra-red sensor. The second sensor scan axis is oriented along the pitch axis of the vehicle. If there were no tilt about either axis, these two scans would be identical. A rotation around the pitch axis is equivalent to revolving the second scan circle such that it is no longer symmetric around its reference marks. The phase shift between the two scans of the two infra-red sensors represents $\Delta A$.

The corrected portion of the reference scan circle during which the infra-red horizon sensors see earth is defined as $2B_c$ where $$B_c = B_0 + \Delta B \qquad (11)$$

The correction, $\Delta B$, is a function of the tilt errors around the scan axes and the angle which the reference axis of the scanner is oriented with respect to the horizontal axis of the vehicle. For the computer described, the reference axis of the scanner coincides with the horizontal axis corresponding to the roll axis of the vehicle, that is, $A_0$, the angle which the scan axis of the infra-red horizon sensor makes with the yaw axis of the vehicle equals 90 degrees. Therefore $\Delta B$ is a function of the attitude error defined as $\Delta A$. It can be computed from the implicit equation $$\cos(B_0+\Delta B) = \cos \Delta A \cos B_0 - \sin \Delta A \qquad (12)$$

Altitude can be computed from the equation $$H = R_e\left(\frac{1}{\sqrt{1/2(1+\sin^2 A_0 \sin^2 B_c - \sin^2 A_0 \cos B_c}}\right) \qquad (13)$$

where $A_0$ represents the angle the scan axis of the reference sensor makes with the vertical axis of the vehicle.

Figure 3:
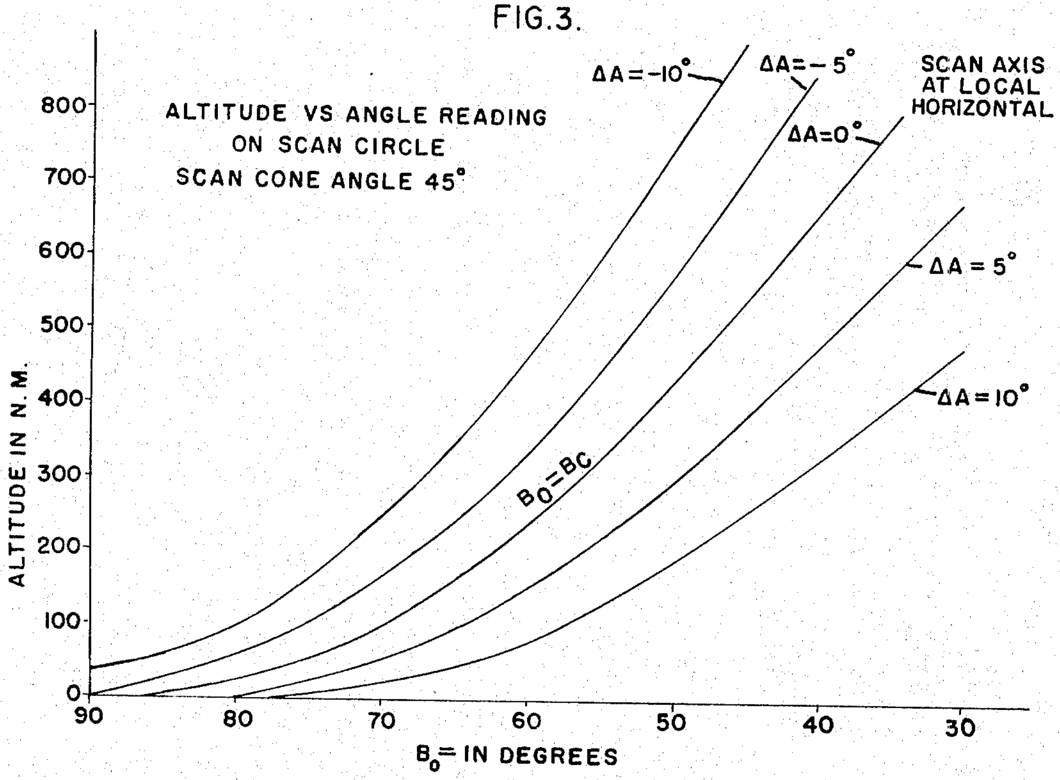
FIGURE 3 is a graph of altitude vs. angle reading on the scan circle.

Curves have been computed to show the relationship of $B_0$, $B_c$, $\Delta A$ and altitude for $A_0$ equal to 90 degrees. These curves are illustrated in FIGURE 3. It should be noted that these equations are true only when the field of view of the scanner is 90 degrees.

We will now consider adjustment of the orbit at the apsis. Additional parameters of an orbit can be expressed in the following manner:

$R$=The altitude at any point on the orbit measured from the center of the earth. A subscript refers to altitude at apogee or perigee.

$a$=The semimajor axis of an ellipse $$\frac{R_a+R_p}{2}$$

$\phi$=The angular displacement past apogee of a position vector.

$V$=The magnitude of the velocity vector. A subscript refers to the velocity of a circular or elliptical orbit at apogee or perigee.

$\theta$=The angle between the velocity vector of an orbit and the roll axis of the vehicle.

$\Delta V$=The magnitude of the adjustment impulse necessary to achieve a circular orbit$=\sqrt{V_e^2 \sin^2 \theta + (V_c - V_e \cos \theta)^2}$ $\psi$=The angle at which the adjustment impulse must be applied. It is measured from the roll axis of the vehicle and defined as the arctan of ratio of the vector $-V_e \sin \theta$ and $V_c - V_e \cos \theta$.

The optimum points on an ellipse to apply adjustment are apogee and perigee. The advantages of adjustment at these points are that mainimum energy is expended in making the adjustment because the thrust is applied parallel to, or directly opposed to, the original satellite velocity vector, and hence the entire velocity increment is effective in changing the magnitude of the velocity vector. The direction of the thrust is horizontal, which simplifies the orbit control computation to that of velocity change only. In addition no system complication is required to orient the vehicle to the horizontal since this will be an established orientation in most cases for other purposes. The orbit parameters have a minimum time variation at apogee or perigee. This decreases the effect of finite propellant burning time and errors due to initiating thrust before or after apogee or perigee is reached.

However, using these techniques there are only two possible altitudes for a circular orbit from a given ellipse so that it would be necessary at times to utilize a transfer orbit to get the vehicle into a suitable orbit with either apogee or perigee at the altitude of the desired orbit. It is also difficult to distinguish exactly where apogee and perigee are since the rate of change around these points is small, especially so where eccentricity of the orbit is small. From FIGURE 3 it can be seen that $B_c$ varies approximately one degree for every 20 nautical miles change in altitude. The equations for adjustment at apogee or perigee are:

$$\Delta V_a = V_{ea} - V_c = \sqrt{\frac{K}{R_a}}\left[\sqrt{\frac{R_p}{a}} - 1\right] \qquad (14)$$

$$\Delta V_p = V_{ep} - V_c = \sqrt{\frac{K}{R_p}}\left[\sqrt{\frac{R_a}{a}} - 1\right] \qquad (15)$$

Figure 4:
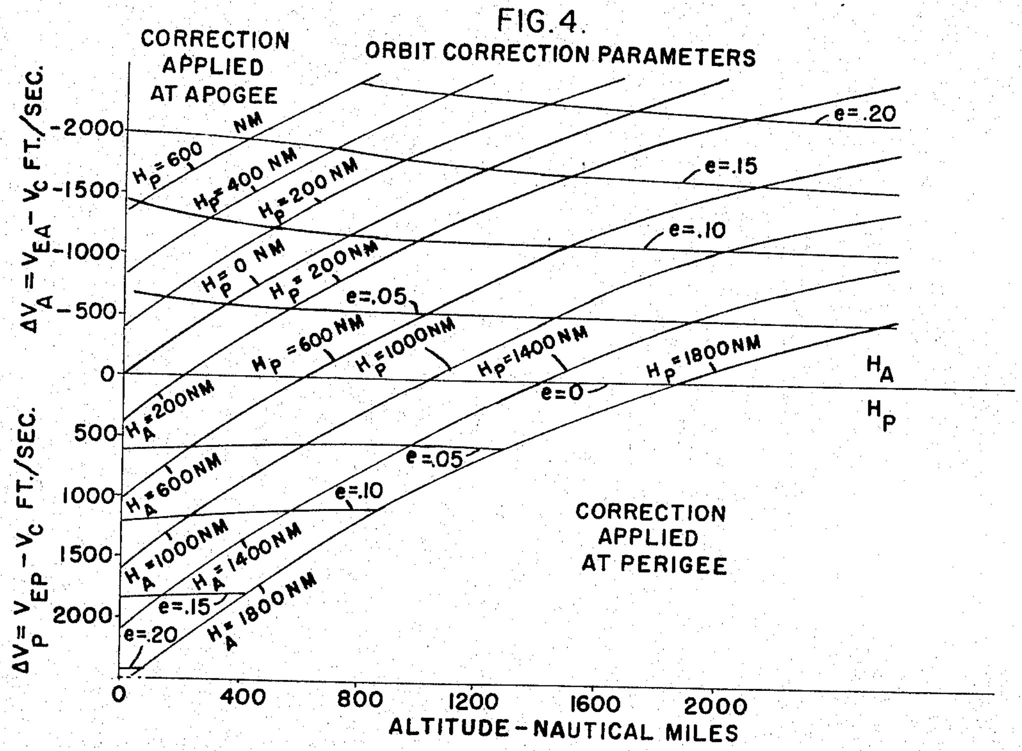
FIGURE 4 is a graph of orbit adjustment parameters.

The solution to these equations for various values of $R_a$ and $R_p$ is shown in FIGURE 4 where $H_a = R_a - R_e$ and $H_p = R_p - R_e$.

An elliptical orbit may also be circularized by a single impulse applied along the vertical axis of the vehicle which can be accomplished at only two points in the orbit.

These points occur at the same altitude and correspond to the end of the latus rectum passed through the center of the earth. The magnitude of ΔV is approximately double that required for adjustment at an apsis. This can be seen by referring to FIGURES 5 and 6 where the necessary calculations are illustrated in graph form. To achieve a particular circular orbit by this method, an initial adjustment would be required to attain an orbit whose latus rectum is at the desired altitude. The major advantage of this type of circularization is that the control around the third or yaw axis is not necessary since the adjustment is made along the vertical axis.

A combination computer and timing device can be utilized to determine when to fire the adjustment impulse in a system of this kind. The time at which the vehicle will be at an end of the latus rectum through the center of the earth can be computed as a function of the altitudes at apogee and perigee. If a timing device is used to initiate the impulse, errors arising from delays in the firing adjustment can be biased out of the system. For an adjustment along the vertical axis where $\psi=90$ degrees $$R=\frac{2R_aR_p}{R_a+R_p} \tag{16}$$

$$\Delta V=\sqrt{\frac{K(R_a+R_p)}{2R_aR_p}}\left[\frac{(R_a-R_p)}{(R_a+R_p)}\right]=\sqrt{\frac{K}{R}}\left(\frac{R_a-R_p}{R_a+R_p}\right)=\sqrt{\frac{K_e}{R}} \tag{17}$$

where $e$ is the eccentricity of the orbit.

Figure 7:
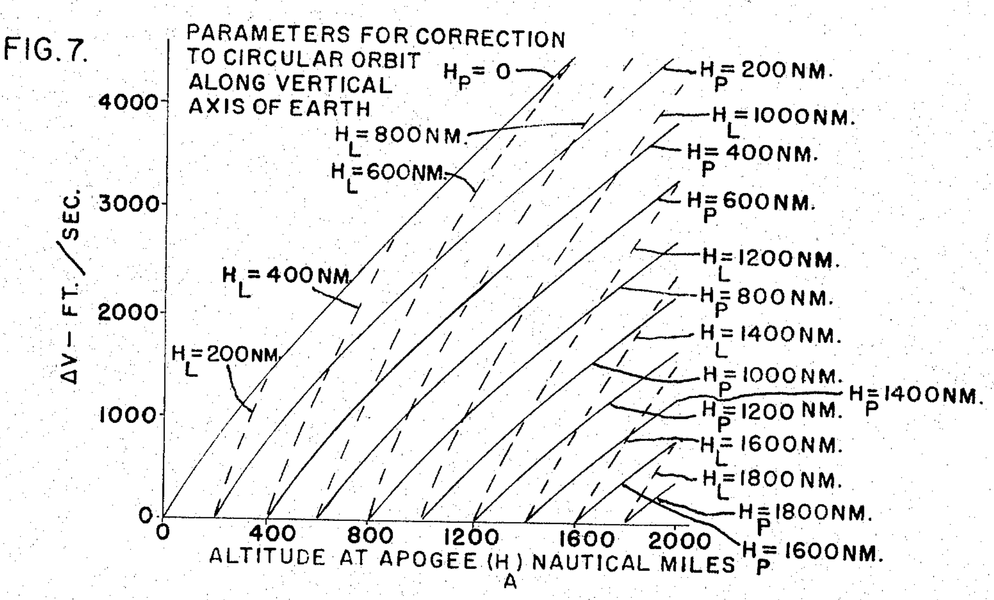
FIG. 7 is a graph of the parameters for adjustment to circular orbit along the vertical axis of the earth.

FIGURE 7 displays in graph form ΔV necessary to achieve a circular orbit by an impulse applied along the vertical axis at point $H_1$ (either end of the latus rectum through the center of the earth) for the ellipse defined by the altitudes at apogee and perigee $H_a$ and $H_p$. This curve can be used to obtain the adjustment impulse and altitude of the circular orbit from a given ellipse or to specify possible ellipses which will result in a circular orbit at a given altitude.

The time required to go from apogee to any point on an ellipse may be computed from the formula $$t=\frac{a^{3/2}}{\sqrt{K}}\left[\sin^{-1}\left(\frac{\sqrt{1-e^2}\tan\theta}{e}\right)-\sqrt{1-e^2}\tan\theta\right] \tag{18}$$

At the end of the latus rectum where $$R=\frac{2R_aR_p}{R_a+R_p}$$

and $e=\pm\tan\theta$ Equation 18 becomes;

$$t=\frac{a^{3/2}}{\sqrt{K}}\left[\sin^{-1}\left(\pm\frac{2\sqrt{R_aR_p}}{(R_a+R_p)}\right)\mp\frac{(R_a-R_p)2\sqrt{R_aR_p}}{(R_a+R_p)^2}\right] \tag{19}$$

This equation is necessary if a timer is used to initiate the impulse. The choice of signs denotes the half of the orbit on which the vehicle is traveling. Another way to detect the point at which to apply an adjustment along the vertical axis is to measure the angle $\phi$ after the vehicle has passed an apsis. When the vertical axis of the vehicle has swept 90 degrees the vehicle is at the proper point. This method necessitates control of the third axis, but it eliminates solving the equation for time on an orbit.

The ideal way to circularize an orbit at a predetermined altitude is to apply the adjustment impulse when the vehicle reaches the desired altitude. This necessitates the ability to change an elliptical orbit at any point. The computer must then be capable of calculating the magnitude ΔV and angle $\psi$ of the velocity vector required to circularize the orbit at any point. The equations to be solved are:

$$\Delta V=V_c-V_e=\sqrt{V_e^2\sin^2\theta+(V_c-V_e\cos\theta)^2}=\sqrt{\frac{K}{R}}\sqrt{3-\frac{R}{a}-\sqrt{\frac{4R_aR_p}{aR}}} \tag{20}$$

$$\psi=\tan^{-1}\left(\frac{-V_e\sin\theta}{V_c-V_e\cos\theta}\right)=\tan^{-1}\left[\frac{-\sqrt{\frac{2a-R}{a}-\frac{R_aR_p}{aR}}}{1-\sqrt{\frac{R_aR_p}{aR}}}\right] \tag{21}$$

In this type of system, the vehicle must be reoriented to an angle such that the resultant impulse is applied at an angle $\psi$.

Figure 5:
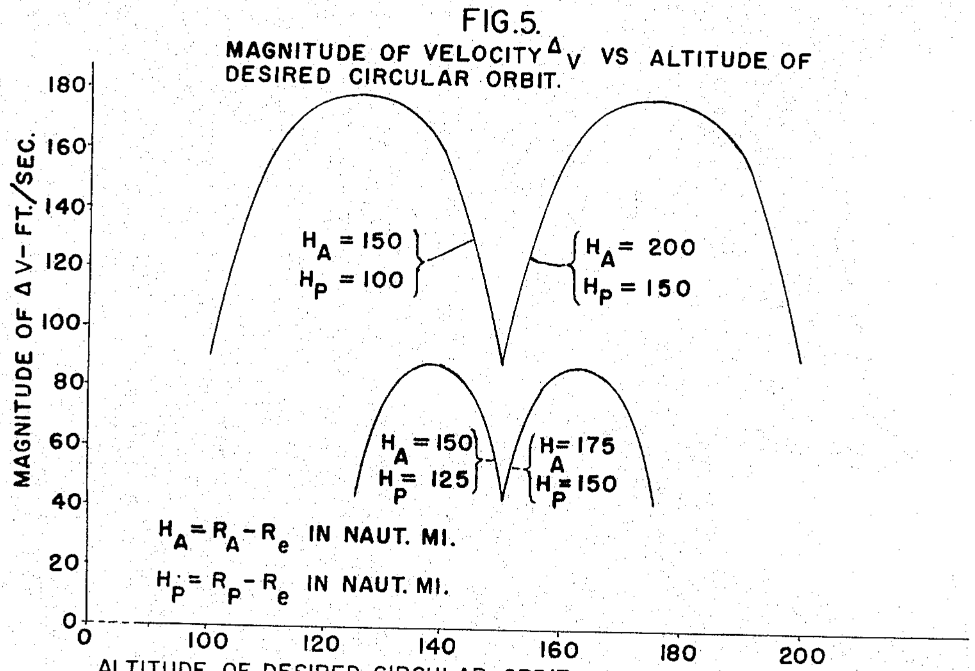
FIGURE 5 is a graph of the magnitude of velocity increment vs. altitude of the desired circular orbit.
Figure 6:
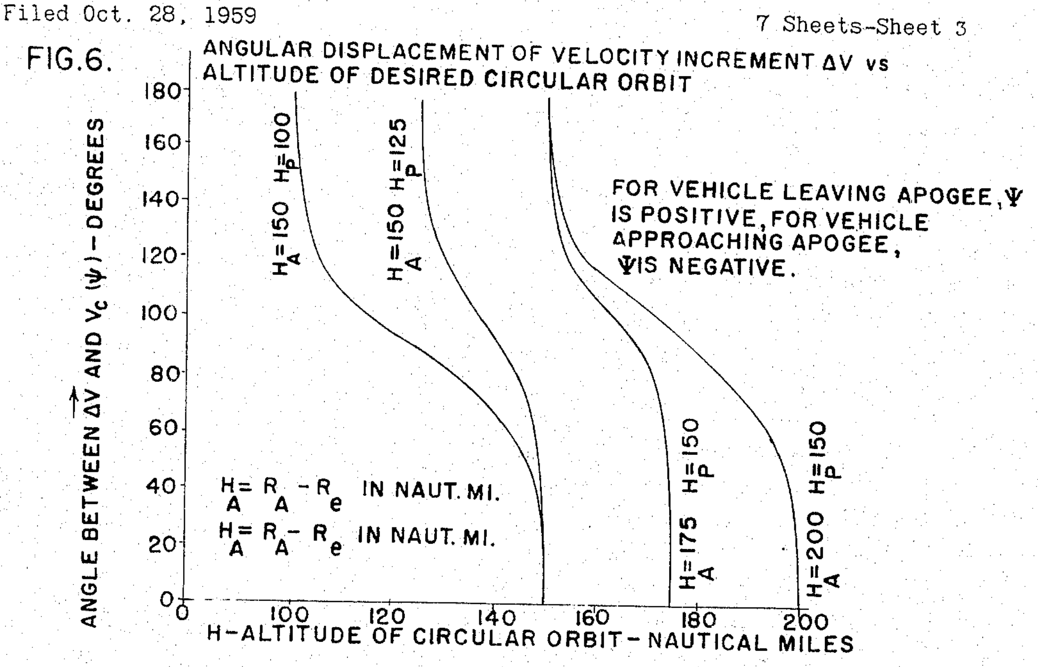
FIGURE 6 is a graph of the angular displacement of the velocity increment vs. altitude of the desired circular orbit.

FIGURES 5 and 6 present curves which show the magnitude of impulse and the angle of application necessary to change an elliptical orbit to a circular orbit for original elliptical orbits of 150±50 nautical miles. The magnitude of the impulse is a minimum at apogee and perigee and a maximum, of approximately twice the minimum value, at a point which corresponds to the ends of the latus rectum through the center of the earth. The angle of the imparted velocity vector varies between zero and 180 degrees. This is to be expected since the angle is zero at apogee, where the impulse must be added to the velocity vector of the ellipse, and 180 degrees at perigee where the impulse must be subtracted from the velocity vector of the ellipse.

An orbit may be changed at any point by applying impulses simultaneously along the horizontal and vertical axes of the vehicle. The equations for this type of change are $$V_c-V_e\cos\theta=\sqrt{\frac{K}{R}}\left[1-\sqrt{\frac{R_aR_p}{aR}}\right] \tag{22}$$

$$-V_e\sin\theta=-\sqrt{\frac{K}{R}}\sqrt{\frac{2a-R}{a}-\frac{R_aR_p}{aR}} \tag{23}$$

Satellite capability to change an orbit at any point can be utilized to determine early in the flight whether the vehicle is approximately on the desired orbit. Data of this kind is useful to establish that the vehicle is not either on a free flight or re-entry path, and if the vehicle is on such a path, an immediate adjustment can be utilized to make the orbit either circular or less elliptical. If the vehicle is already in an elliptical orbit of approximately the right eccentricity, apogee and perigee may be measured later in the orbit and adjustment made then, or calculations could be made with the early altitude information to predict apogee, perigee and the velocity impulse.

A computer will now be described which will measure altitude at apogee and compute the imparted velocity required to circularize the orbit at apogee. Such a computer is capable of being flown on a re-entry vehicle having a ballistic trajectory. The peak of the trajectory path will simulate the apogee of an elliptical orbit. Perigee information can be present in the computer. Given these two altitude readings at apogee and perigee, the computer will compute the imparted velocity to be applied at apogee required to make the orbit circular at apogee. The preset perigee need not be the actual apsis for the portion of the elliptical orbit over which the missile is flying. The perigee may be chosen to correspond with the approximate eccentricity of a satellite orbit. The fact that the computer is calculating one orbit and the missile is flying on another will not disturb the open loop results of the computer on such a flight.

Figure 8:
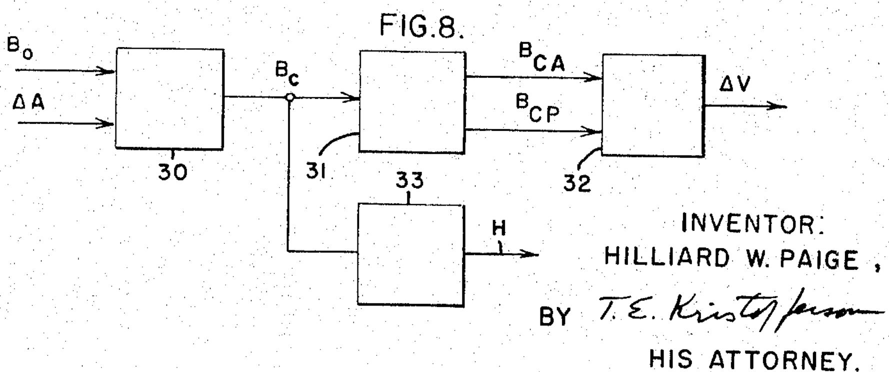
FIGURE 8 is a functional block diagram of an embodiment of the computer for adjusting at apogee with a pre-set perigee.

A functional block diagram of the computer is set out in FIGURE 8. Block 30 represents circuitry for solving Equations 11 and 24 to arrive at a value for $B_c$. Block 31 is an incremental function stepper the output position of which is representative of $B_c$. Block 32 solves Equation 25 for the magnitude of the adjustment impulse required and block 33 solves the altitude Equation 13. It is understood, of course, that this functional block diagram may incorporate the same piece of equipment in more than one of the blocks where the same function is duplicated and that FIG. 8 is only meant to illustrate the mathematical analysis. $B_0$, the horizon signal in the form of pulse width information and $\Delta A$, a DC voltage representing the tilt around the pitch axis of the vehicle, are the inputs to block 30 of the computer and are supplied by the infra-red horizon sensor system. The $B_0$ signal is generated by the sensor scanning around the roll axis and is taken from the output of the signal centering circuit. $\Delta A$ is the output of the sensor scanning around the pitch axis and can be taken off the mixer network from the input to the trigger amplifier. These portions of the circuit are both described in the above referenced co-pending application. The computer is designed to be used when the scan axis of the reference sensor is oriented along the horizontal axis corresponding to the roll axis of the vehicle. Given these inputs, Equations 11 and 12 may be used to calculate $B_{ca}$ and $B_{cp}$. An approximation has been introduced in the equation for $\Delta B$ such that $$\Delta B = \frac{\Delta A}{\sin B_c} \qquad (24)$$

Figure 9:
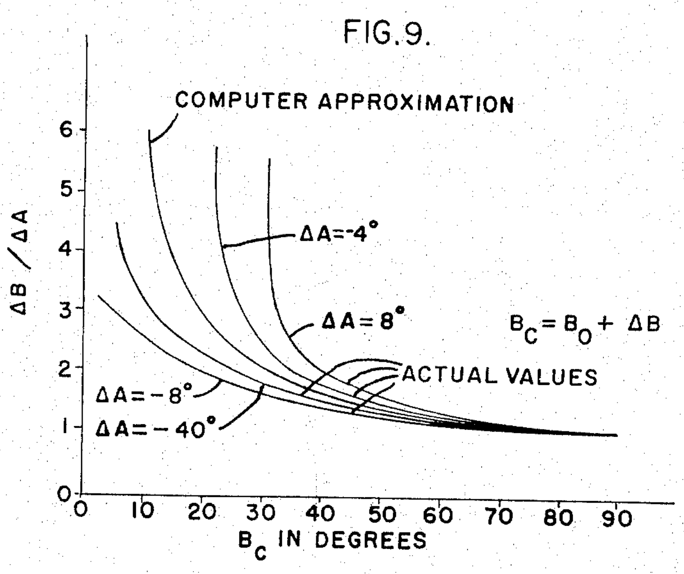
FIGURE 9 is a graph of actual values and a computer approximation of $B_c$, the corrected reading in degrees of a half portion of scan representing the earth.
Figure 10:
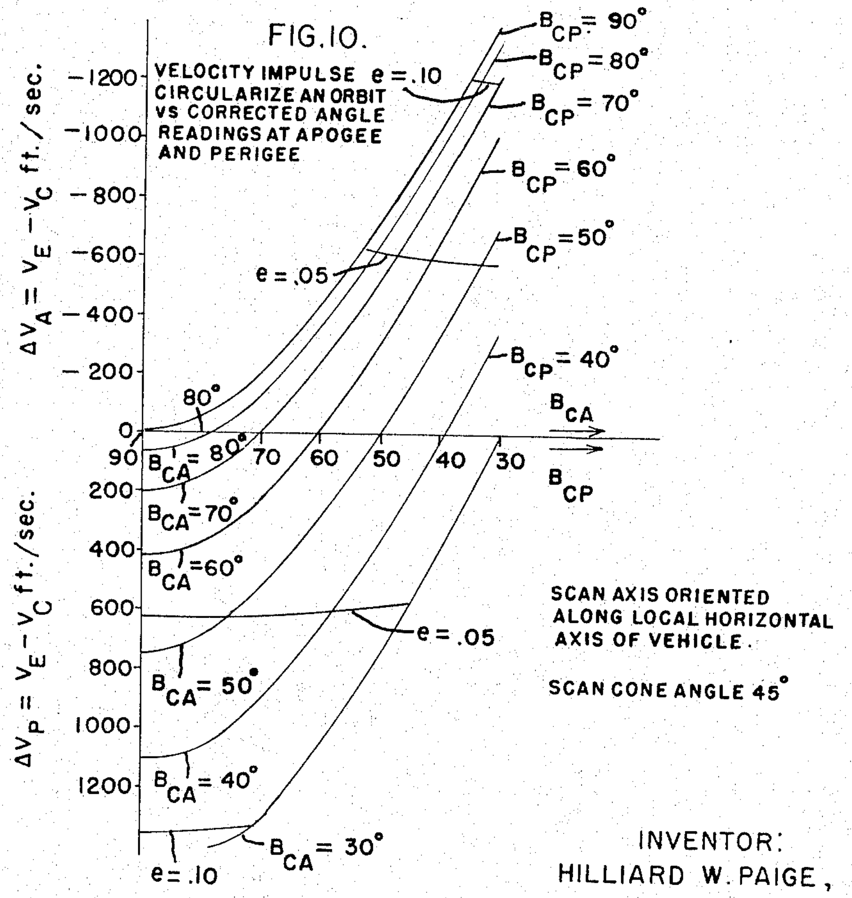
FIGURE 10 is a graph of the velocity impulse required to circularize an orbit vs. corrected angle readings at apogee and perigee.

This approximation was utilized so that the same servos which are driven by $B_{ca}$ and $B_{cp}$ can be used to correct the $B_0$ reading to allow for rotations about the yaw axis of the vehicle. The accuracy of this approximation depends upon the amount of the rotation and the corrected angle $B_c$ which is related to altitude. For 40 degrees $<B_c<90$ degrees, corresponding to 650 nautical miles, $>H>0$, and a tilt angle within $\pm 8$ degrees, the approximation is acceptable. A curve of the actual error introduced as a function of the angular rotations and the magnitude of $B_c$ is presented in FIGURE 9. The velocity impulse $\Delta V$, can be related directly to the values of $B_{ca}$ and $B_{cp}$. FIGURE 10 shows the relationship. The intermediate step of calculating altitude H is omitted in computing $\Delta V$ from $B_{ca}$ and $B_{cp}$, since more equipment would be required and one more source of error introduced. Altitude may be computed on a separate channel as indicated in FIGURE 8. The portion of the curves in FIGURE 10 which represents $\Delta V$ vs. $B_{ca}$ have been mechanized for the computer by the approximate equation $$\Delta V = f_1(B_{cp}) + Kf_2(B_{cp})g(B_{ca}) \qquad (25)$$

where $f_1(B_{cp})$, $f_2(B_{cp})$ and $g(B_{ca})$ are non-linear functions of the angles at apogee and perigee. These functions have been calculated through utilization of a computer program written for a high speed digital computer. They are mechanized for this computer through the use of non-linear servo-driven potentiometers.

Figure 11:
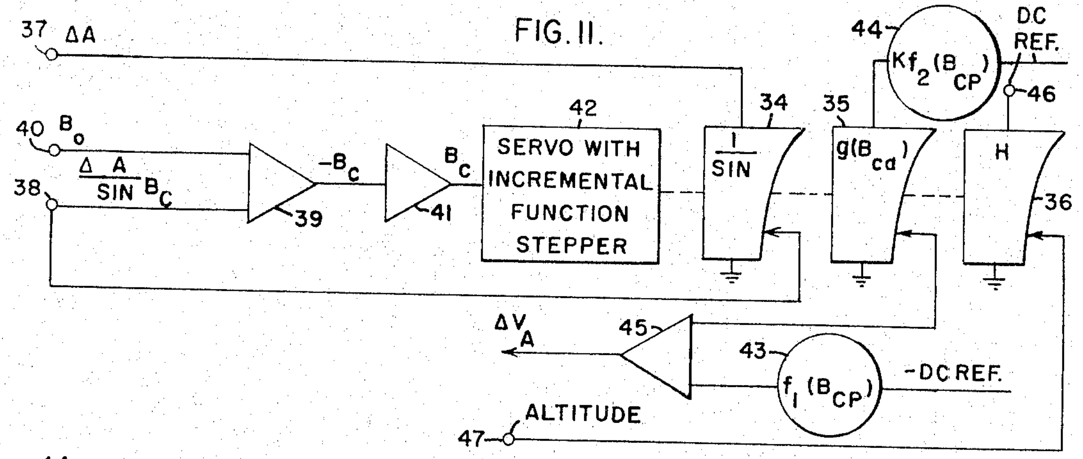
FIGURE 11 represents a schematic diagram of an embodiment of the computer for adjusting at apogee with a pre-set perigee.

FIGURE 11 shows a schematic diagram of the computer with preset perigee information. $B_c$ is available as shaft rotation and is derived by summing the horizon signal $B_0$ in pulse width form and a non-linear function of $\Delta A$, a DC voltage from the infra-red horizon sensor system representing rotation about the yaw axis of the vehicle, $B_c$ drives an electro-mechanical servo which positions three non-linear potentiometers, 34, 35 and 36. Non-linear potentiometer 34 is a cosecant function. The $\Delta A$ signal is introduced on terminal 37 and applied across potentiometer 34 where it is multiplied by the non-linear servo potentiometer 34 to produce a function $$\frac{\Delta A}{\sin B_c}$$

This function is added to $B_0$ by applying it to one terminal 38 of an addition amplifier 39, and by applying $B_0$ to the other input terminal 40. The output of amplifier 39 is $-B_c$ so the sign is reversed by using a second amplifier 41. The output of amplifier 41 is $B_c$ and serves to drive a servo with an incremental function stepper 42, the position of which is proportional to $B_c$. The position of servo 42 controls the setting on non-linear potentiometers 34, 35 and 36.

For this particular computer, the perigee is preset, therefore $f_1(B_{cp})$ and $f_2(B_{cp})$ are constants which may be fixed through the use of trim pots 43 and 44 respectively. $g(B_{ca})$ is a non-linear function which is simulated by a suitable potentiometer 35 connected to the servo shaft driven by $B_c$. $Kf_2(B_{cp})$ is placed on the high side of potentiometer 35 and therefore the output signal represents $Kf_2(B_{cp})g(B_{ca})$. The sum of this term and $f_1(B_{cp})$ will yield $\Delta V_a$ and is derived by applying the output of potentiometer 35 to one input of summing amplifier 45 and the output of potentiometer 43 to the other input of amplifier 45. The output of amplifier 45 therefore represents $\Delta V_a$.

The incremental function stepper associated with the servo 42 senses when the vehicle is at apogee. When the stepper indicates that apogee has been reached and the vehicle is commencing its downward descent, a timer (not illustrated) may be triggered, which puts the branch of the circuit computing $\Delta V_a$ output of operation for the remainder of the flight. This timer could be utilized to trigger a firing circuit to apply the thrust at the apogee point of an amount represented by $\Delta V_a$ to circularize the orbit at this point.

Altitude may be computed on a separate channel. Since it is a non-linear function of $B_c$ the third non-linear potentiometer 36 must be connected to the servo 42 which is positioned by $B_c$. A DC reference is applied to terminal 46 across potentiometer 36 and the output of potentiometer 36, available at terminal 47, is representative of altitude.

Figure 12:
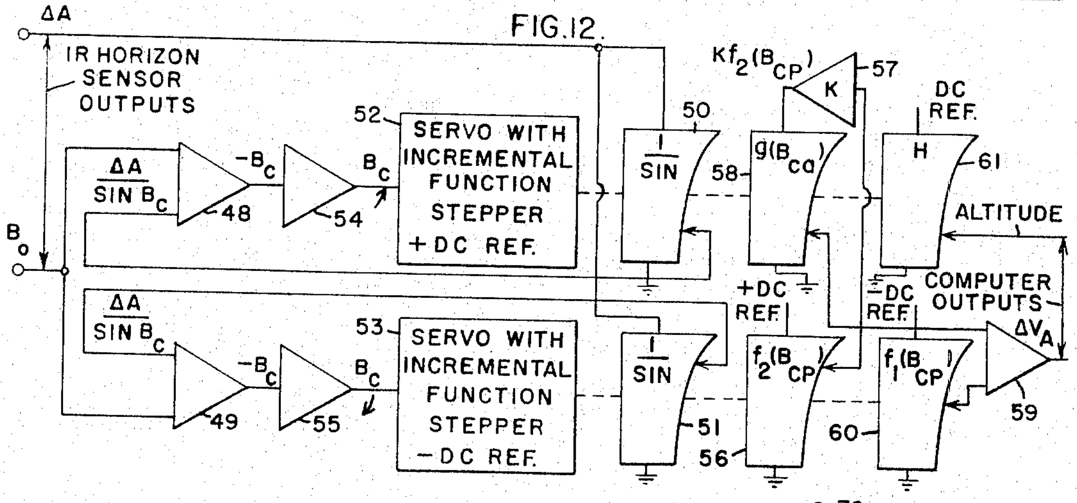
FIGURE 12 illustrates in schematic form a diagram of a computer for changing at apogee while computing both apogee and perigee information, in other words, a computer for transferring to a circular orbit at apogee from an elliptical orbit.

FIGURE 12 illustrates a schematic of the computer which is capable of computing $\Delta V_a$ for a satellite orbit where both perigee and apogee must be recorded. The circuit is similar to the circuit illustrated in FIGURE 11, except that two servos are required for the computation of $B_{ca}$ and $B_{cp}$.

In FIGURE 12 two summing amplifiers 48 and 49 are employed. $B_0$ is fed to one input of each of these amplifiers. $\Delta A$ is placed across non-linear potentiometers 50 and 51 which are positioned by servos with incremental function steppers 52 and 53 respectively. Non-linear potentiometers 50 and 51 are a cosecant function and are positioned by the servos 52 and 53 in accordance with $B_c$. Therefore, the outputs of potentiometers 50 and 51 are the product $$\frac{\Delta A}{\sin B_c}$$

which is fed back as the second input to adders 48 and 49 respectively.

The outputs of adders 48 and 49 are therefore $-B_c$ and are inverted by amplifiers 54 and 55 to provide $B_c$ for positioning the servos 52 and 53. As indicated, servo 52 has a positive DC reference, and servo 53 has a negative DC reference. These servos each driven in only one direction. When an apsis has been reached the timer fires a signal to freeze the output. The steppers can be reset after an adjustment impulse has been fired.

Since this application is to compute perigee as well as apogee, we have a non-linear potentiometer 56 driven by incremental function stepper servo 53 in accordance with $B_c$. A DC reference is placed across potentiometer 56 and the configuration of the potentiometer is in accordance with $f_2(B_{cp})$. This output is taken from potentiometer 56 and fed through an amplifier 57 having a gain of K to provide the required constant such that the output of amplifier 57 is $Kf_2(B_{cp})$. This is then applied across non-linear potentiometer 58 representative of a function $g(B_{ca})$ and driven by servo 52 in accordance with $B_c$. The output of potentiometer 58 is then summed in amplifier 59 with the output of another potentiometer 60, which is a non-linear potentiometer representative of $f_1(B_{cp})$ and is driven in accordance with $B_c$ by servo 53. A minus DC reference is placed across potentiometer 60. The output of amplifier 59 is then representative of $\Delta V_a$ in accordance with Equation 25. Again, altitude information may be obtained from this computer by means of an additional non-linear potentiometer 61 biased by a DC reference and driven by servo 52 in accordance with $B_c$.

In this description, it is assumed that the adjustment velocity is applied as an impulse. In practice, of course, the adjustment is applied over a finite interval. A rough approximation of the error resulting from the application of the adjustment impulse over a finite interval can be attained by presuming the whole impulse was applied at a time on the orbit past apogee equal to the finite time interval. A representative value for the time interval over which $\Delta V$ is applied can be taken as 10 seconds. For an orbit where $R_a$ equals 3,938 and $R_p$ equals 3,438, the angle $\phi$ will change .57 degree in 10 seconds and the resultant orbit error will be 2 nautical miles. This rough calculation is a very pessimistic view of the effect of assuming the velocity increment as an impulse. It may be concluded that the error resulting from this assumption is negligible with respect to other errors involved.

There is an inherent error in the $\Delta A$ correction due to the approximation made in the equation for the computer. A curve illustrating this error and the area where the approximation is acceptable is indicated in FIGURE 9. Orbit errors resulting from the assumption that the earth is a perfect sphere have been found to be small, of the order of less than 1 nautical mile.

Figure 13:
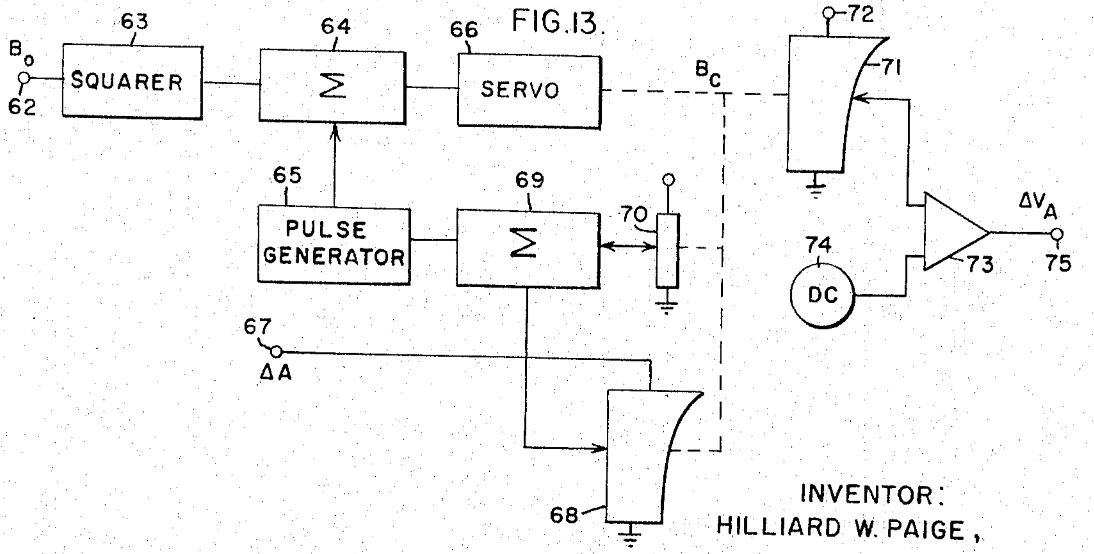
FIGURE 13 represents a block diagram of an embodiment of the computer for implementing the block diagram of FIGURE 1.

An embodiment such as that illustrated in FIGURE 11 has been implemented in the manner illustrated by the circuit of FIGURE 13. The positive $B_0$ pulses are applied to terminal 62 which is the input to a squarer or pulse standardizer 63 used to standardize the pulses. The output of squarer 63 provides a positive pulse input for a summing network 64 which has a second input from a negative pulse generator 65. The residue of $B_0$ pulses and pulse generator 65 is applied to drive a servo 66 with a stepping motor which has an output shaft position representative of $B_c$. $\Delta A$ is applied to terminal 67 across non-linear potentiometer 68 which is representative of cosecant $B_c$. Potentiometer 68 is mechanically driven by servo 66 in accordance with $B_c$. The output from potentiometer 68 is summed in summer 69 with the output of a linear feedback potentiometer 70, also driven by servo 66 in accordance with $B_c$. The output of summer 69 is fed to pulse generator 65 and closes the feed-back loop through pulse generator 65 to summer 64 to provide the correction for $B_c$ due to the $\Delta A$ error.

Servo 66 also mechanically drives the wiper on non-linear potentiometer 71 which is representative of a function $g(B_{oa})$ and has placed across it on terminal 72 a constant reference representative of $Kf_2(B_{cp})$. The output of potentiometer 71 is summed in summing circuit 73 with the negative DC reference 74 representative of $f_1(B_{cp})$ at the fixed perigee selected. The output of summing amplifier 73 appears on terminal 75 and represents $\Delta V_a$, the adjustment impulse required at apogee.

The circuit of FIGURE 13 may be implemented using the following components. This list of components is understood to only be illustrative of one embodiment of the invention, and the invention is in no way limited thereto. The squarer 63 may comprise a pulse standardizer 3A60 obtainable from Solid State Devices, Incorporated. This device operates similarly to a thyratron. Summing circuit 64 may be an emitter follower configuration of an N405D transistor. Stepping servo 66 with associated stepping switch, and the non-linear potentiometers 68 and 71 may be obtained from Giannini, Coville Township, N.J. Potentiometer 70 is a 500 ohm linear potentiometer. Summing circuit 69 utilized a 2N697 transistor connected as an emitter follower. Negative pulse generator 65 employs a complementary mono-stable, normally saturated, flip-flop circuit incorporating one 2N1132 and one N400A transistor in the flip-flop with a second 2N1132 serving as a constant current charging element to linearize the output pulse width as a function of input voltage from feed-back potentiometer 70 and potentiometer 68. Summing amplifier 73 is constructed using a 2N1132 transistor emitter follower feeding into a flip-flop incorporating two 2N697 transistors, the on-time of one of which is representative of $\Delta V_a$.

While particular embodiments of the invention have been described and one in particular has been illustrated, it will be understood, of course, that it is not intended to limit the invention thereto since many modifications may be made, and that it is therefore contemplated by the appended claims to cover any such modifications as fall within the true spirit and scope of the invention.

What is claimed as new and desired to be secured by Letters Patent of the United States is:

1. A satellite orbit changing system comprising means for sensing a signal representative of a function of satellite altitude, means for calculating from said signal the impulse required to circularize the orbit at apogee, means to detect the point on said orbit when the satellite is at apogee, and means for producing a signal representative of the magnitude of the impulse required to be applied to said satellite in order to circularize said orbit.

2. A satellite orbit changing computer adapted to receive a first signal representative of a function of satellite altitude and a second signal representative of tilt comprising means for computing a third signal representative of a corrected function of altitude from said first and second signals, means for deriving a fourth signal from said third signal representative of a constant times a function of altitude at apogee times a constant signal representative of a function of altitude at perigee, means for providing a second constant signal representative of a function of altitude at perigee, means for adding said fourth signal and said second constant signal to compute a fifth signal representative of the thrust required to be applied at apogee to circularize the orbit at apogee.

3. A satellite orbit changing computer adapted to receive a first signal representative of a function of satellite altitude and a second signal representative of satellite tilt comprising means for computing a third signal representative of a corrected function of altitude from said first and second signals, means for deriving a fourth signal from said third signal representative of a constant times a function of altitude at apogee times a constant signal representative of a function of altitude at perigee, means for providing a second constant signal representative of a function of altitude at perigee, means for adding said fourth signal and said second constant signal to compute a fifth signal representative of the thrust required to be applied at apogee to circularize the orbit at apogee, and means for computing the occurrence of apogee of the satellite from said third signal.

4. A satellite orbit changing computer adapted to receive a first signal representative of a function of satellite altitude and a second signal representative of satellite tilt comprising means for computing a third signal representative of a corrected function of altitude from said first and second signals, means for deriving a fourth signal from said third signal representative of a constant times a function of altitude at apogee times a constant signal representative of a function of altitude at perigee, means for providing a second constant signal representative of a function of altitude at perigee, means for adding said fourth signal and said second constant signal to compute a fifth signal representative of the thrust required to be applied at apogee to circularize the orbit at apogee, and means for computing a sixth signal representative of altitude from said third signal.

5. A satellite orbit changing system adapted to receive a first signal representative of a function of satellite altitude and a second signal representative of satellite tilt comprising means for computing a third signal representative of a corrected function of altitude from said first and second signals, means for deriving a fourth signal from said third signal representative of a constant times a function of altitude at apogee times a constant signal representative of a function of altitude at perigee, means for providing a second constant signal representative of a function of altitude at perigee, means for adding said fourth signal and said second constant signal to compute a fifth signal representative of the thrust required to be applied at apogee to circularize the orbit at apogee, means for computing a sixth signal representative of altitude from said third signal, means for computing the occurrence of apogee of the satellite from said sixth signal.

6. A satellite orbit changing computer comprising means for computing the corrected reading of a half portion of scan representing the earth from a signal representing the uncorrected reading of a half portion of scan representing the earth from one sensor and a second signal representing the tilt angle about the axis of a second sensor, a non-linear potentiometer having a characteristic representative of a first function of said corrected reading at apogee, means for applying a constant voltage across said non-linear potentiometer representative of a constant times a second function of said corrected reading at perigee, means for positioning a wiper on said non-linear potentiometer in accordance with said corrected reading, a source of a second constant voltage representative of a third function of said corrected angle at perigee, a summing network, means connecting said second constant voltage and the output of said non-linear potentiometer to the input of said summing network whereby the output of said summing network is representative of the amount of thrust required to be applied at apogee to circularize said orbit.

7. A satellite orbit changing computer adapted to receive a first signal representative of a function of satellite altitude and a second signal representative of a function of satellite tilt comprising a pulse standardizer, a summing network and a servo having an incremental function stepping switch connected in series respectively; a feedback loop driven by said incremental function stepping switch comprising a linear potentiometer and a first non-linear potentiometer both driven by said switch each having an output summed in a second summing network, the output of which drives a negative pulse generator for applying pulses to a second input of said first summing network; means for applying said first signal to the input of said pulse standardizer; means for applying said second signal across said first-non-linear potentiometer; a second non-linear potentiometer representative of a function of altitude at apogee; means for driving said second non-linear potentiometer from said stepping switch; means for applying a third signal across said second non-linear potentiometer representative of a constant times a function of altitude at perigee; means for providing a fourth signal representative of a second function of altitude at perigee; and means for adding the output of said second non-linear potentiometer and said fourth signal to derive a fifth signal representative of the thrust required to be applied to the satellite at apogee in order to circularize the orbit with a radius equal to the altitude at apogee.

References Cited

UNITED STATES PATENTS 2,415,348 2/1947 Haigney ---------------- 102—50

OTHER REFERENCES

Satellites and Spaceflight, Burgess, 1957; Chapman and Hall, Ltd., London; pp. 14–25.

RODNEY D. BENNETT, *Primary Examiner.*

FREDERICK M. STRADER, CHESTER L. JUSTUS, SAMUEL FEINBERG, BENJAMIN A. BORCHELT, *Examiners.*

D. G. REDINBAUGH, A. E. HALL, L. HALLACHER, M. F. HUBLER, *Assistant Examiners.*